(12) United States Patent
Bell (10) Patent No.: US 11,446,991 B2
(45) Date of Patent: Sep. 20, 2022

(54) COLLAPSIBLE DOOR FRAME AND FABRIC COVER

(71) Applicant: James Bell, Rockport, ME (US)

(72) Inventor: James Bell, Rockport, ME (US)

( * ) Notice: Subject to any disclaimer, the term of this patent is extended or adjusted under 35 U.S.C. 154(b) by 0 days.

(21) Appl. No.: 17/300,359

(22) Filed: May 25, 2021

(65) Prior Publication Data
US 2021/0283998 A1    Sep. 16, 2021

Related U.S. Application Data

(63) Continuation-in-part of application No. 15/999,892, filed on Aug. 28, 2018.

(51) Int. Cl.
*B60J 5/04* (2006.01)

(52) U.S. Cl.
CPC ............. *B60J 5/0487* (2013.01); *B60J 5/048* (2013.01); *B60J 5/0468* (2013.01)

(58) Field of Classification Search
CPC .............................. B60J 5/0487; B60J 5/0486
See application file for complete search history.

(56) References Cited

U.S. PATENT DOCUMENTS

| | | | |
|---|---|---|---|
| 2,460,399 A | 2/1949 | Schassberger | |
| 2,620,224 A | 12/1952 | Hedley | |
| 2,682,427 A | 6/1954 | Bright | |
| 3,055,700 A | 9/1962 | Glas | |
| 4,070,056 A | 1/1978 | Hickman | |
| 4,220,298 A | 9/1980 | Willis | |
| 4,644,699 A | 2/1987 | Chandler | |
| 4,733,902 A * | 3/1988 | Rabb | B60J 7/104 296/214 |
| 6,773,054 B2 | 10/2004 | Martini | |
| 7,275,670 B1 | 10/2007 | Shumack | |
| 7,293,681 B2 | 11/2007 | Wills | |
| 7,597,385 B2 * | 10/2009 | Shibata | B60J 5/0487 296/190.11 |
| 7,686,379 B2 | 3/2010 | Lemieux | |
| 8,794,692 B1 | 8/2014 | Burk | |
| 9,150,181 B2 * | 10/2015 | Schroeder | B60R 21/026 |
| 9,156,336 B2 * | 10/2015 | Fennell | B60J 5/08 |
| 9,387,747 B2 | 7/2016 | Wang | |
| 9,487,174 B2 * | 11/2016 | Szewczyk | B60J 5/0487 |
| 9,527,371 B2 | 12/2016 | Flores | |
| 10,106,019 B2 * | 10/2018 | Rafeld | B60J 5/0476 |
| 11,230,171 B2 * | 1/2022 | Stickles | B60J 5/0486 |
| 2002/0093224 A1 | 7/2002 | Richardson | |
| 2016/0023543 A1 * | 1/2016 | Rutland | B60J 5/0487 49/463 |
| 2017/0203640 A1 * | 7/2017 | Rafeld | B60J 5/0487 |
| 2019/0248218 A1 * | 8/2019 | Bell | B60J 5/0487 |
| 2022/0041040 A1 * | 2/2022 | Clancy | B60J 5/0481 |

* cited by examiner

*Primary Examiner* — Jason S Morrow
(74) *Attorney, Agent, or Firm* — Randal Homburg

(57) ABSTRACT

A collapsible door frame with an extendable fabric cover replaces a factory door for a sport utility vehicle, providing the vehicle for operation without a door while still allowing the drive to assemble and install the collapsible door frame and extend the fabric cover to provide protection from adverse weather conditions.

5 Claims, 8 Drawing Sheets

COLLAPSIBLE DOOR FRAME AND FABRIC COVER

CROSS REFERENCE TO RELATED APPLICATIONS

This is a Continuation-in-Part Application of patent application Ser. No. 15/999,892, filed on Aug. 28, 2018, by the same inventor.

I. BACKGROUND OF THE INVENTION

1. Field of Invention

A collapsible door frame with an extendable fabric cover replaces a factory door for a sport utility vehicle, providing the vehicle for operation without a door while still allowing the drive to assemble and install the collapsible door frame and extend the fabric cover to provide protection from adverse weather conditions.

2. Description of Prior Art

A preliminary review of prior art patents was conducted by the applicant which reveal prior art patents in a similar field or having similar use. However, the prior art inventions do not disclose the same or similar elements as the present utility vehicle accessory door, nor do they present the material components in a manner contemplated or anticipated in the prior art.

This is evident in certain prior art wherein the factory hard panel doors are replaced by alternative door panels (U.S. Pat. No. 7,686,379 to Lemieux, U.S. Pat. No. 6,773,054 to Martini, U.S. Pat. No. 4,644,699 to Chandler, U.S. Pat. No. 4,220,298 to Willis, and U.S. Pat. No. 4,070,056 to Hickman), and recreational vehicles which provide for on-board storage systems for the door panels, as seen in U.S. Pat. No. 7,293,681 to Willis and U.S. Pat. No. 7,275,670 to Shumack.

A door flap is suspended from an upper roll bar support/cage, providing a "gull wing" which defines a frame, one or more panels, a latch and a lift-assist device such as a gas-strut, in U.S. Pat. No. 8,794,692 to Burke. A removable door skin for a vehicle mounting on a door frame member includes a flexible door panel that includes an edge and a flap, as well as a fastening means which provides a first part on the flexible door panel and a second part on the flap, shown as a hook and loop fastening material, as demonstrated in U.S. Pat. No. 7,686,379 to Lemieux.

An open mesh door panel comprising a rigid frame member has an open mesh panel over the frame member in U.S. Pat. No. 6,773,054 to Martini, while a transparent door panel is shown in U.S. Pat. No. 4,644,699 to Chandler, using space age plastic clear panels having high impact capacity for Jeeps an earth moving machines, providing full side vision. A fabric covered door frame over a resilient skeletal framework is shown in U.S. Pat. No. 4,070,056 to Hickman, the framework being bent to conform to the door opening. Other frame and fabric door panels are shown in earlier patent, U.S. Pat. No. 3,055,700 to Glas, U.S. Pat. No. 2,682,427 to Bright, and U.S. Pat. No. 2,620,224 to Hedley.

None of the above prior art patents demonstrate a replacement door for a sport utility vehicle comprising a component door frame installed within the hinges of the vehicle door opening with a fabric cover which is recoiled and deployed upon a cylindrical, spring-loaded rod integrated within the collapsible door frame and hinges, the deployed fabric door panel extending across the door frame and attached thereto, as defined within the scope of the present collapsible door frame and fabric door panel.

II. SUMMARY OF THE INVENTION

Owners of sport utility vehicles often choose to remove the doors from the vehicles for off road activities, by removing the doors from the hinges and either leaving them behind at a storage location or storing them within the vehicle. This open door provision is common, and requires the disengagement of a rod which connects the respective doors to the vehicle door frame openings, either by independent hinge pins or a common hinge pin which extends through an upper and lower hinge mount and the upper and lower door hinge.

The present collapsible door frame with an extendable fabric cover provides the collapsible door frame with a multiple component assembly which defines a door frame of the same size and configuration as the factory supplied doors and attaches in the same manner as the factory supplied doors, with the exception of a fabric door panel assembly which integrates with the upper and lower hinge mounts and the upper and lower door hinges defined within the collapsible door frame, providing a pull-out door panel which extends across the collapsible door frame and connects to the door frame by a plurality of connecting means to provide protection against adverse outdoor elements while being operated by the user until such time as the user decides to remove the collapsible door frame with an extendable fabric cover and return it to storage.

III. DESCRIPTION OF THE DRAWINGS

The following drawings are submitted with this utility patent application.

IV. DESCRIPTION OF THE PREFERRED EMBODIMENT

Figure 1:
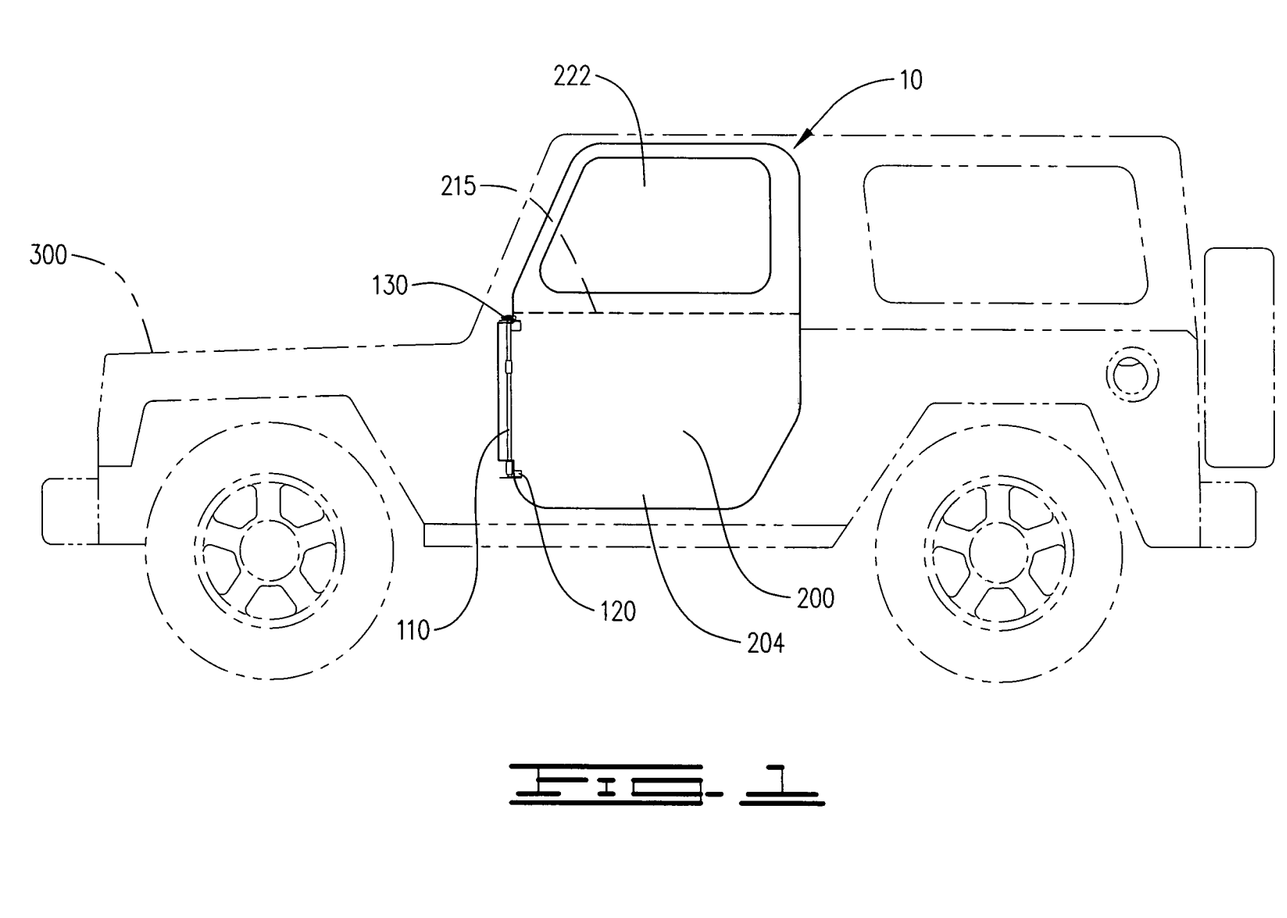
FIG. 1 is a left side view of a collapsible door frame with an extended fabric cover on a sport utility vehicle, the vehicle shown in phantom line.

A replacement door assembly 10 for a sport utility vehicle 300, as shown in FIGS. 1-10 of the drawings, provides for operation the vehicle without factory supplied doors, as presented in the phantom line drawings of FIG. 1. In the event of inclimate weather or optional safety purposes on the highway, the installation of a collapsible door frame 20 and a retractable fabric door panel 200 is applied to the vehicle by installation and placement the replacement door assembly 10 on the sport utility vehicle 300 or quickly remove and store them in a collapsed embodiment as opposed to storing and reinstalling the factory supplied door, not shown.

Figure 9:
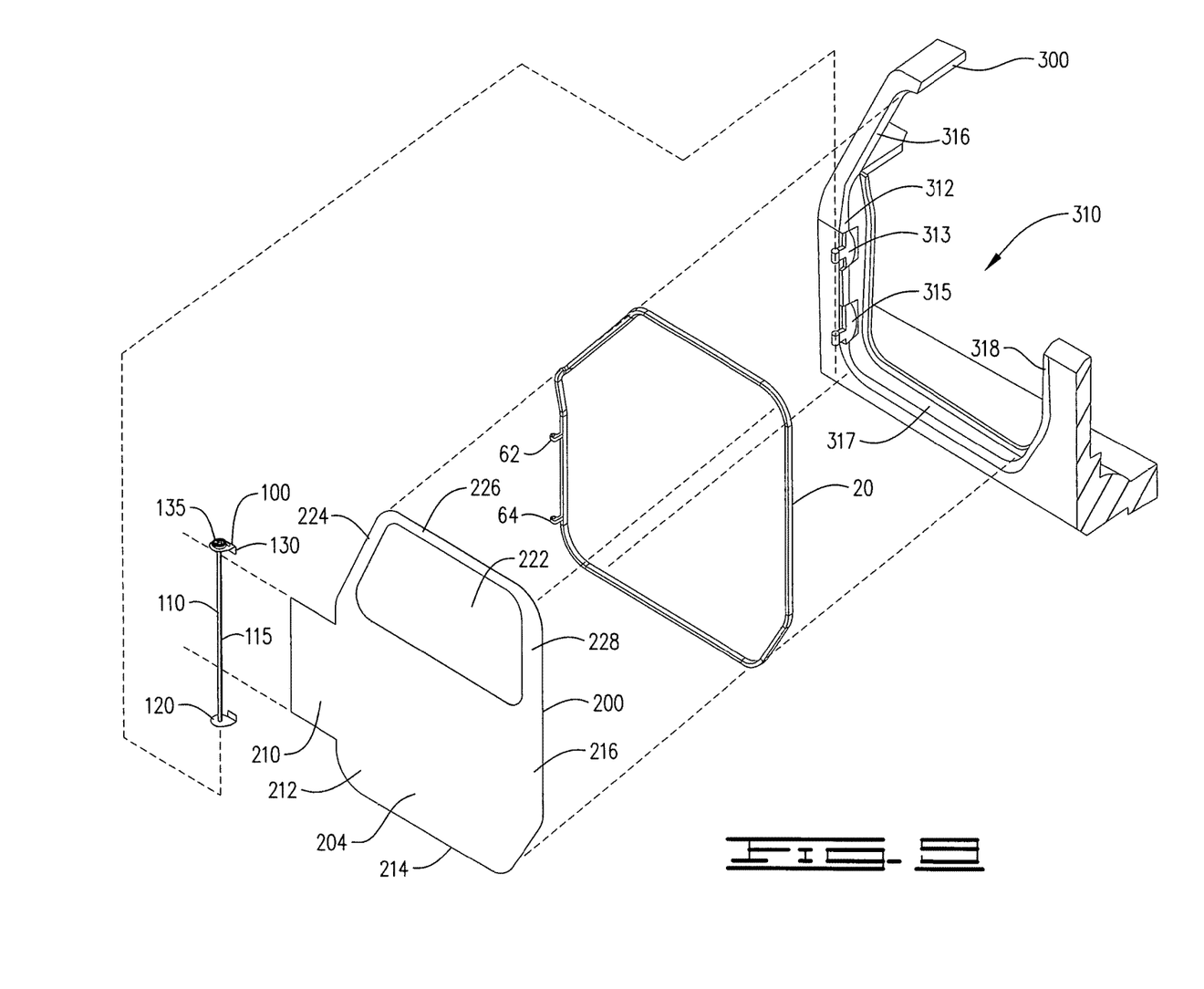
FIG. 9 is a perspective and exploded view of the winding hinge member, the deployed fabric door cover, the collapsible door frame and the sport utility door opening with broken lines indicating the manner of assembly.

Beginning with FIG. 9, this exploded view indicates a door opening 310 of the sport utility vehicle 300 defining a front section 312 complete with an upper hinge member 313 and a lower hinge member 315, an angular upright extension 316 generally conforming to a window post, better shown in FIG. 1, a lower section 317, and a rear section 318. Various sport utility vehicles may provide a different presentation, but all will have these essential elements in common. This sport utility vehicle door opening 310, for each sides of the vehicle, will determine the outer contour, dimensions and external perimeter definitions of the collapsible door section, best shown in 5-7 and 9. Further, the collapsible door frame 20 will define the deployed fabric door panel 200 in a deployed position, shown in FIGS. 1-3, 8A and 9, also conforming to the sport utility vehicle door opening. The replacement door assembly 10 is provided for both the driver side door opening 310, shown, as well as the passenger side door opening, not shown but a mirror image of that shown in the drawing figures.

Figures 5, 6:
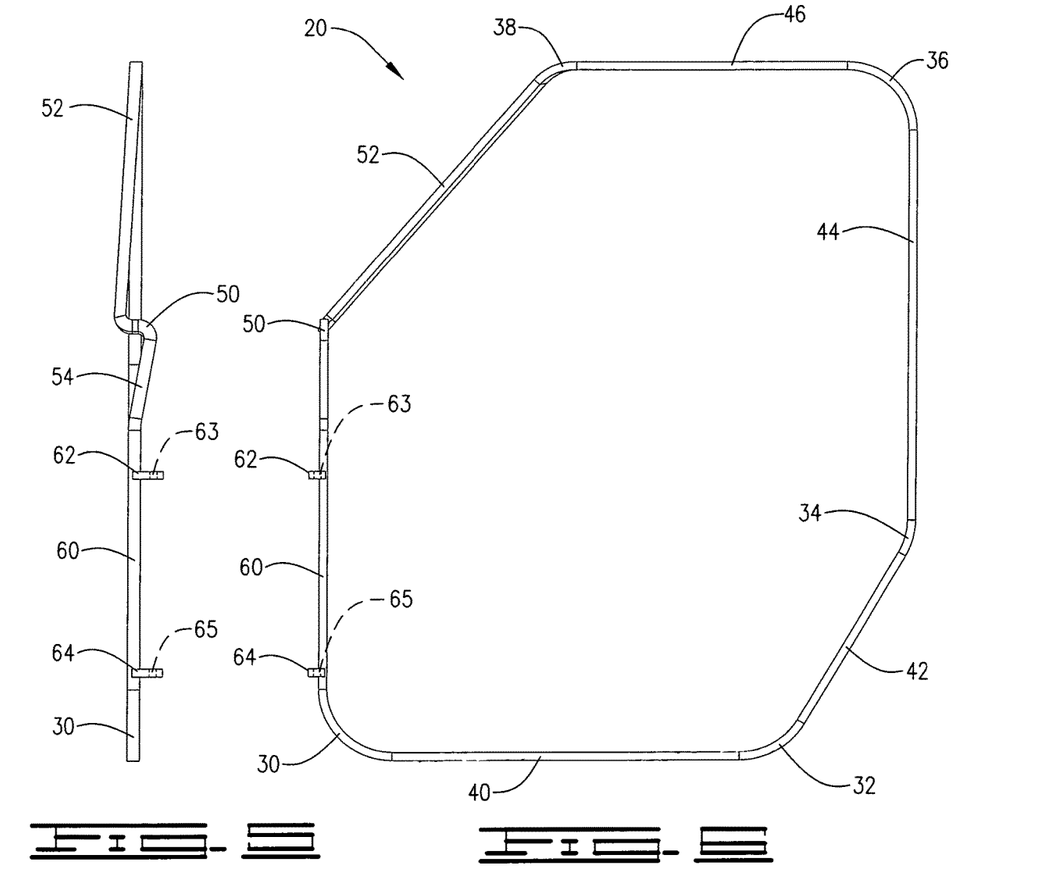
FIG. 5 is a front end view of the collapsible door frame in a fully assembled embodiment.
FIG. 6 is an outer side view of the collapsible door frame in a fully assembled embodiment.
Figure 5A:
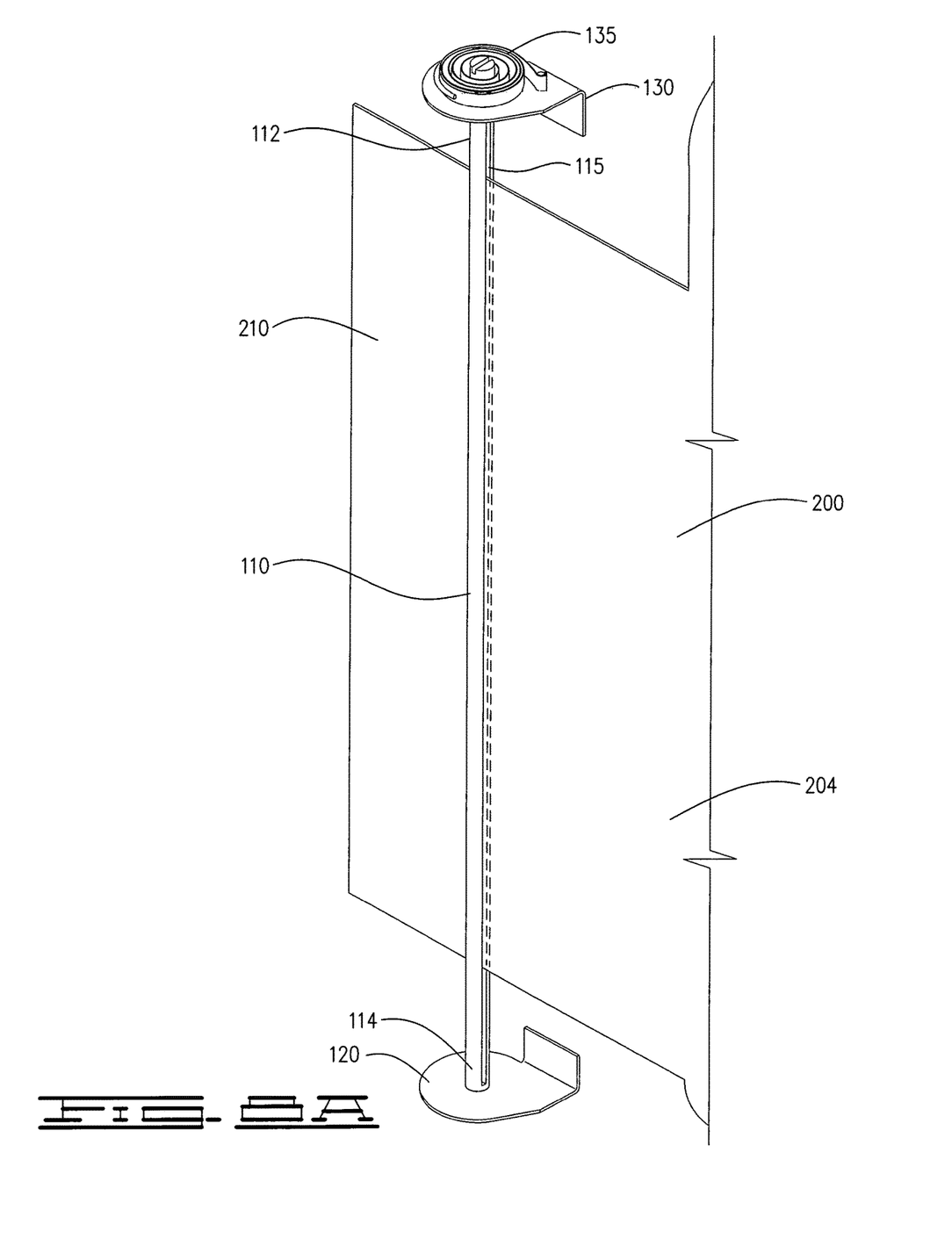
Figure 7:
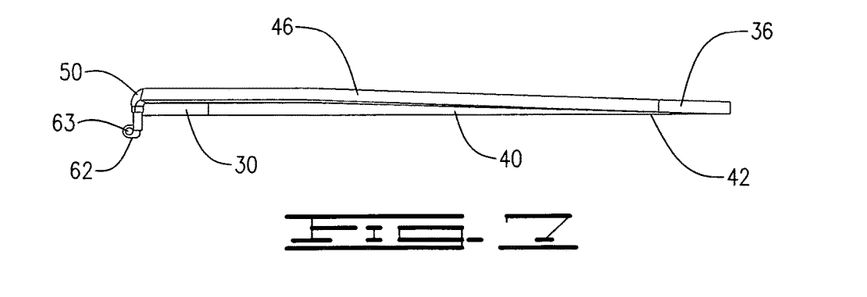
FIG. 7 is a top view of the collapsible door frame in a fully assembled embodiment.
Figure 8:
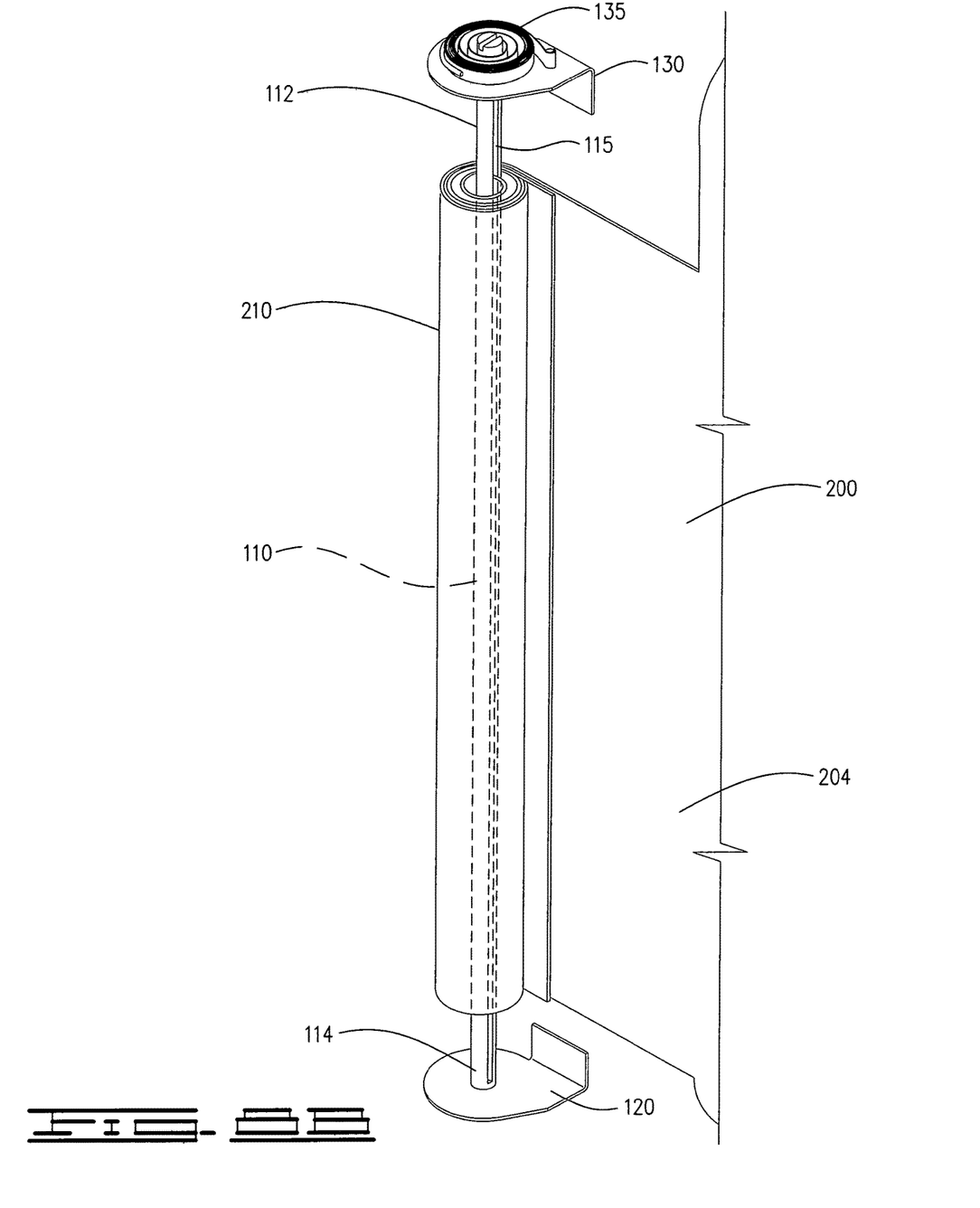
FIG. 8A is a perspective view of a winding hinge member with the lower end cap installed on a lower end of the central vertical shaft and the upper spring coil and end cap installed on an upper end of the central vertical shaft, with a narrowed flat front portion of the inserted through the vertical panel slot of the central vertical shaft.
FIG. 8B is the same as FIG. 8A, except that the fabric door panel is folded as indicated in FIG. 4 and partially wound around the central vertical shaft is a retracted embodiment.

The collapsible door frame 20 is defined by a series of connected components, shown in one embodiment in FIG. 6. In this embodiment, which is a driver side collapsible door frame, there is a lower front corner section 30, a lower rear curved section 32, a rear curved transitional section 34, an upper rear corner section 36, an upper front curved section 38 and a front retractable section 50 extending an upper arm 52 and a lower arm 54. Between the lower front corner section 30 and the lower rear curved section 32 is a horizontal connector rod 40, between the lower rear curved section 32 and the rear curved transitional section 34 is a rear transitional connector rod 42, between the lower rear curved transitional section 34 and the upper rear corner section 36 is a rear vertical connector rod 44, between the upper rear corner section 36 and the upper front curved section 38 is a top horizontal connector rod 46, also shown in FIG. 7, and between the lower arm 54 of the front retractable section 50 and the lower front corner section 30 is a vertical hinge section 60, defining an upper hinge arm 62 with a vertical bore 63 and a lower hinge arm 64 with a vertical bore 65, also shown in FIG. 5. The hinged vertical section 60 is further connected to the lower front corner section 30 to complete the collapsible door frame 20. While this is the embodiment shown in FIGS. 5-7, those skilled in the art will observe that multiple embodiments defining the size, shape and component assembly may be presented, with the assembly of components defining the appropriate size, shape and point of connection, and manner of connection forming the same overall collapsible door frame 20.

An outer surface 22 is defined in the collapsible door frame to which a plurality of perimeter connector means 70. In the embodiment shown in the drawing figures, this plurality of perimeter connector means 70 is presented by a base connector attached around the door frame to the outer surface 22 at selected points. These selected points are based upon the strategic points where the fabric door panel attachment 200 would most stabilize the integrity of collapsible door frame 20, but could be more or less placed in other locations. The components of the collapsible door frame 20 are preferably made from square aluminum tubing, which would eliminate the rotation of the connected components and also provide the collapsible door frame 20 in a lightweight and durable components assembly. Additionally, the front retractable section 50 may be replaced by one or more stationary of folding components to connect the vertical hinge section 60 to the upper front curved section 38 and may even include a spring loaded complete collapsible door frame connected together in a folded position which springs into the final assembled stated adapted for the door frame with little urging, as seen in walking canes or other metal shaped devices.

The connection of each collapsible door frame component in the disclosed embodiment in the drawing figures would be by an insertion of one components within the other, as known in the art of metal frame assembly, with the best embodiment provided by each end of each lower front corner section 30, lower rear curved section 32, rear curved transitional section 34, upper rear corner section 36, upper front curved section 38, upper arm 52 and lower arm 54 defining a reduced taper, each reduced taper adapted to be inserted and secured within respective ends of the applicable respective horizontal connector rod 40, rear transitional connector rod 42, rear vertical connector rod 44, top horizontal connector rod 46, and vertical hinge section 60, or vice versa, where each connector rod defines narrow tapered ends inserted within each respective curved or corner section. Optionally provided but not shown is a temporary locking means located within each connection, which could include a spring loaded member engaging a slot or other known means.

Figure 2:
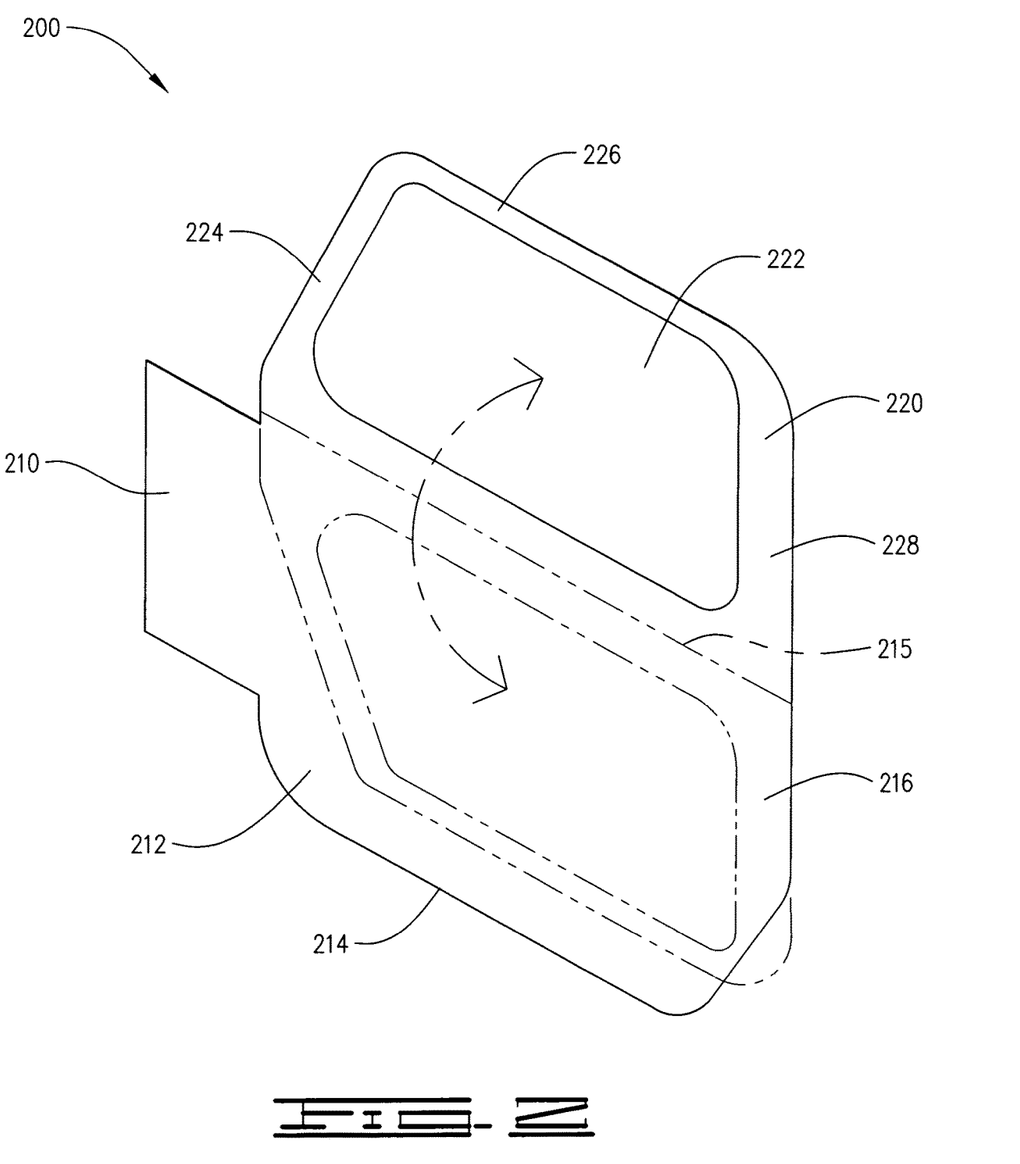
FIG. 2 is a perspective view of the fabric cover with the solid lines showing the extended and raised window portion, with the phantom lines showing the window section in a folded lowered position.
Figure 3:
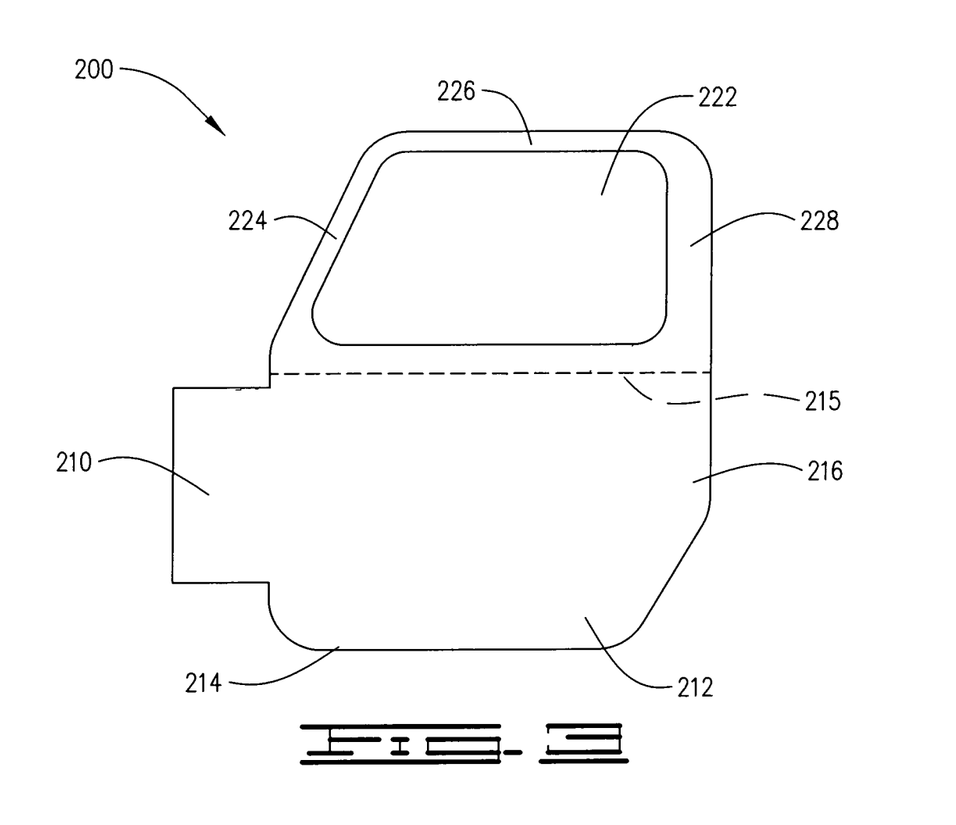
FIG. 3 is a side view of the fabric door cover in the fully deployed position with a section line where the window section fold line is presented.
Figure 4:
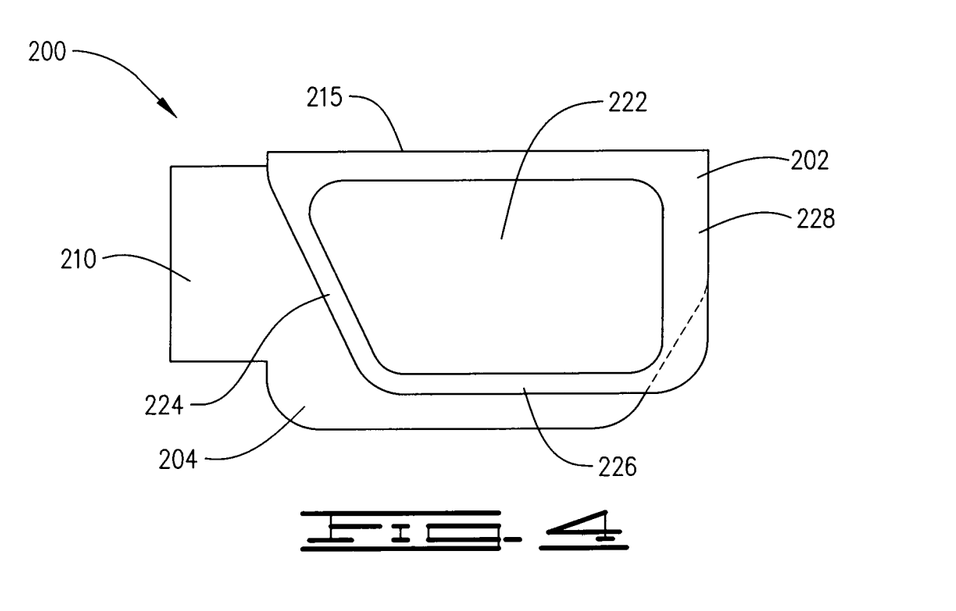
FIG. 4 is a side view of the fabric door cover in the fully deployed position with the window section folded along the fold line of FIG. 3.
Figure 10:
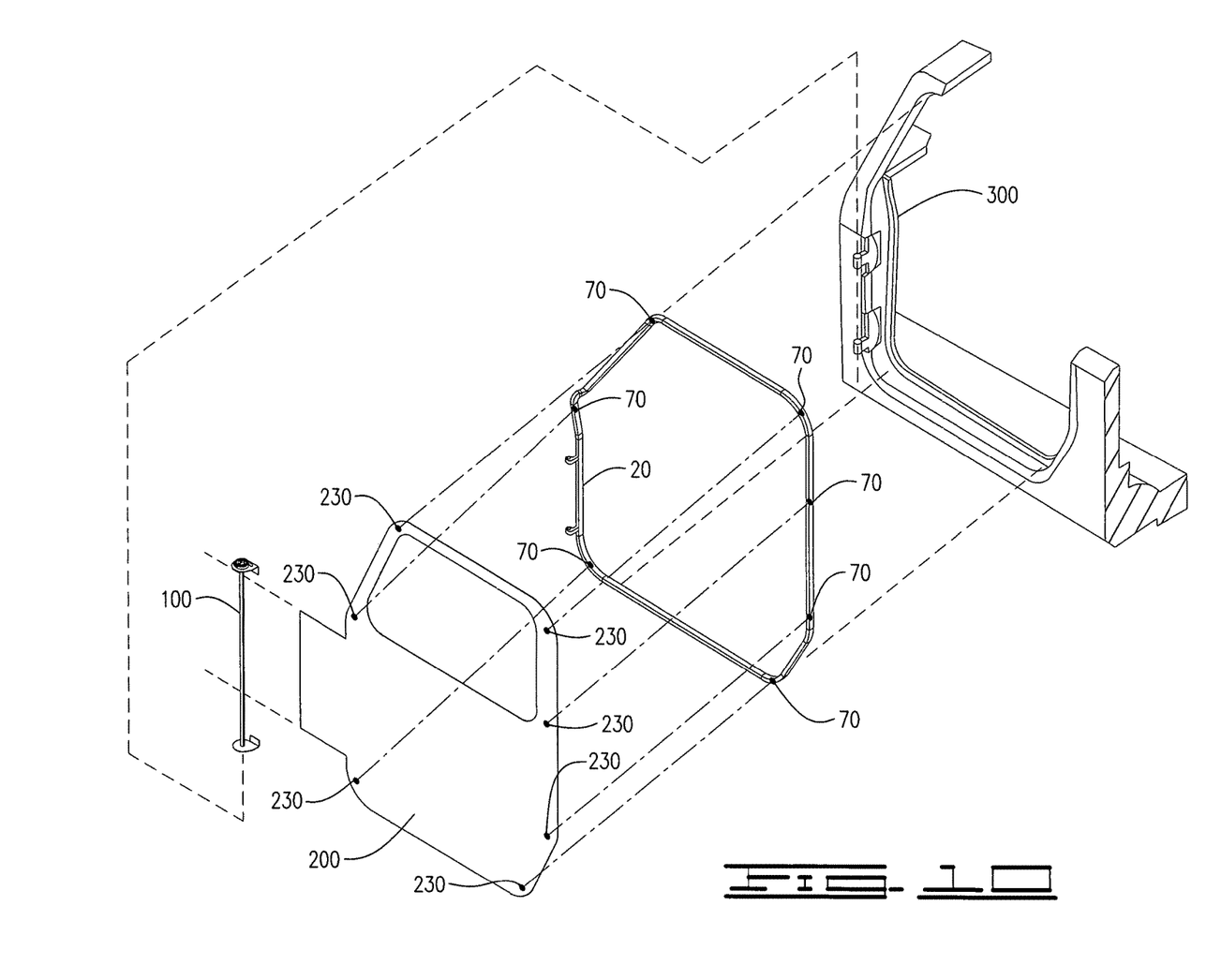
FIG. 10 is the same drawing as FIG. 9, except with additional numbers to indicate the perimeter connection means on the fabric door panel and the collapsible door frame as assembled.

The fabric door cover 200, shown in FIGS. 2-4 and 9 in various states of folding, but in a deployed position, defines a front vertical flap 210, a lower section 212 defining a lower margin 214, a horizontal fold line 215, a rear portion 216, and a folding window portion 220 presenting a window cut-out section 222, a front window margin 224, and upper window margin 226 and a rear window margin 228. The fabric door cover 200 further defines an inner surface 202 and an outer surface 204. Figure demonstrated the fabric door cover 200 in a fold-down position along the horizontal fold line 215 of FIG. 3. FIG. 2 further demonstrates the folding window portion 220 in a raised or lowered position. The inner surface 202 of the fabric door cover 200 includes the opposing connecting means 230 which allows the fabric door panel 200 in the deployed position to be secured to the collapsible door frame 20. In FIG. 10, a cap connector 230 is provided around the perimeter of the fabric door panel 200, corresponding in location to a respective base connector 70 on the collapsible door frame 20, the cap connector 230 and the base connector 70 removably secured together to attached the fabric door panel 200, or a portion thereof, to the collapsible door frame 20, thus providing the replacement door assembly 10 for the sport utility vehicle 300, as shown in FIG. 1. Other connecting means 70, 230, may include a hook and loop fastening material, buttons and button holes, snaps, crimps, elastic bands, studs, pins, snap hooks or other. The choice of fabric would be a tear resisting, moisture repellant and washable material, including DYNEEMA®, ballistic nylon, luggage grade nylon, canvas, rubberized fabric, military vinyl, coated mesh, neoprene or stretchable suede would be suited for fabric door panel.

A winding hinge member 100 serves two functional purposes: a) to secure the collapsible door frame within the hinges of the vehicle, and b) to wrap the fabric door panel around a central shaft in a wound and stored condition until such time as it is deployed as shown in FIGS. 1 and 10. The winding hinge member 100, shown in FIGS. 1 and 8A-9, defines a central vertical shaft 110 having and upper end 112, a lower end 114, and a vertical panel slot 115, a removable lower cap piece 120 removably connecting to the lower end 114 and an upper cap piece 130 permanently connecting to the lower end 114, the upper cap piece 130 having an upper shaft winding coil 135.

FIG. 8A shows the front vertical flap 210 of the fabric door cover 200 inserted within the vertical panel slot 115 prior to being recoiled to wind the fabric door panel 200 around the central vertical shaft 110. FIG. 8B demonstrates the fabric door cover 200 when partially wound around the central vertical shaft 110 in a folded and retracted position, the folded position similarly shown in FIG. 4. The central vertical shaft 110 is inserted through the vertical bore 63 of the upper hinge arm 62 and the vertical bore 65 of the lower hinge arm 64 on the vertical hinge section 60 of the assembled collapsible door frame 20 and further through the upper hinge member 313 and lower hinge member 315 of the door opening 310 of the sport utility vehicle 300, allowing the collapsible door frame 20 to pivot open or closed within the door opening 310. The front vertical flap 310 is then inserted within the vertical panel slot 115, and the operator would allow the unwound and spring-loaded upper shaft winding coil 135 to wind the folded fabric door panel 200 around the central vertical shaft 110 until such time as the fabric is fully coiled. The lower cap piece removably connects and secures to the lower end 114 of the central vertical shaft 110 and ensures that the central vertical shaft 110 remains secure within the collapsible door assembly 20 and the upper and lower hinge members 313, 315, of the sport utility vehicle 300. When needed, the fabric door panel 200 can be unfurled unfolded to be secured to the collapsible door frame 20 by the supplied perimeter connector means 70, 230, in whole or in part for a full door panel or a partial door panel. When use is no longer required, the fabric door panel 200 can be refolded and recoiled back around the central vertical shaft 110 until deployed and secured again.

While the replacement door assembly 10 has been particularly shown and described with reference to a preferred embodiment thereof, it will be understood by those skilled in the art that changes in form and detail may be made therein without departing from the spirit and scope of the invention.

What is claimed is:

1. A replacement door assembly adapted to a sport utility vehicle providing the sport utility vehicle with an option to operate the vehicle without doors while providing a compact replacement during weather incidents or roadway operations, comprising:
   a collapsible door frame defining a plurality of corner sections, curved sections and connector rods which are assembled to define said collapsible door frame adapted to respective door openings of said sport utility vehicle, said assembled collapsible door frame further providing an outer surface and a vertical hinge section defining and upper hinge arm having a vertical bore and a lower hinge arm having a vertical bore removably connecting to a respective upper hinge member and a respective lower hinge member of said door frame of said sport utility vehicle;
   a fabric door panel defining a front vertical flap and an inner surface selectively connecting to said outer surface of said collapsible door frame by a plurality of cap connectors attached to said inner surface of said fabric door panel and a plurality of perimeter connector means attached to respective outer surface of said collapsible door frame, securing said fabric door panel to said collapsible door frame, said fabric door panel further defining a folding window section defining a cutout window portion; and
   a winding hinge member defining a central vertical shaft with a vertical panel slot receiving said front vertical flap of said fabric door panel prior to winding said fabric door panel around said central vertical shaft for compact storage, said central vertical shaft also removably attaching said upper hinge arm to said upper hinge member and said lower hinge arm to said lower hinge member to hingeably connect said collapsible door frame within said respective door openings of said sport utility vehicle.

2. The replacement door assembly of claim 1, said collapsible door frame comprising:
   a front retractable section, defining an upper arm and a lower arm, included within said collapsible door frame; and
   said perimeter connector means is a base connector which removably connects with said cap connector of said fabric door panel.

3. The replacement door assembly of claim 1, said fabric door panel comprising:
   an outer surface, a lower section with a lower margin, a horizontal fold line below said window cutout section, a rear portion, said folding window section further defining a front window margin, an upper window margin and a rear window margin surrounding said cutout window portion, said horizontal fold line allowing said fabric door panel to be folded to reduce said fabric door panel prior to being wound around said central vertical shaft of said winding hinge member for compact storage.

4. The replacement door assembly of claim 1, said winding hinge member comprising:
   said central vertical shaft further defining a lower end removable securing a lower cap piece and an upper end securing an upper cap piece with an upper shaft winding coil providing the central vertical shaft with a spring-loading retractable capacity to assist in winding the fabric panel, in a folded position, around said central vertical shaft, wherein said lower cap piece is removed when said central vertical shaft is being inserted or removed from said respective hinge members and said hinge arms, after which said lower end cap is resecured to said lower end of said central vertical shaft.

5. The replacement door assembly of claim 1, said collapsible door frame comprising:
   a lower front corner section, a lower rear curved section, a rear curved transitional section, an upper rear corner section, an upper front curved section and a front retractable section extending an upper arm and a lower arm;

a horizontal connector rod between said lower front corner section and said lower rear curved section, a rear transitional connector rod between said lower rear curved section and said rear curved transitional section, a rear vertical connector rod between said lower rear curved transitional section and said upper rear corner section, a top horizontal connector rod between said upper rear corner section and said upper front curved section, and said vertical hinge section between a lower arm of said front retractable section and said lower front corner section to complete the collapsible door frame.

* * * * *